United States Patent

Balai et al.

[11] Patent Number: 5,807,474
[45] Date of Patent: Sep. 15, 1998

[54] PROCESS FOR THE PREPARATION OF CATALYSTS AND FOR CRACKING MINERAL OIL FRACTIONS

[75] Inventors: Märia Balai, Százhalombatta; Hermann Beyer, Budapest; István Czágler, Százhalombatta; Arpád Csóka, Százhalombatta; Pál Fehér, Százhalombatta; János Forstner, Százhalombatta; László Galambos, Százhalombatta; László Kántor, Százhalombatta; Antal Katona, Százhalombatta; Mária Lenkei; Gabriella Pál née Borbély, both of Budapest; Tamás Sulyok, Dunakeszi; László Szirmai, Emília; Eszter Tátrai, Budapest; Olga Terényi née Gavrikova, Budapest; Gábor Tolvaj, Érd, all of Hungary

[73] Assignee: MOL Magyar Olaj-és Gázipari Részvénytársaság, Budapest, Hungary

[21] Appl. No.: 754,393

[22] Filed: Nov. 21, 1996

[30] Foreign Application Priority Data

Nov. 22, 1995 [HU] Hungary ................................. 95 0334

[51] Int. Cl.$^6$ ............................. C10G 11/05; B01J 29/06
[52] U.S. Cl. ............................. 208/120; 208/113; 502/63; 502/68; 502/69; 502/71; 502/77
[58] Field of Search .................................. 502/63, 68, 69, 502/71, 77; 208/113, 120

[56] References Cited

U.S. PATENT DOCUMENTS

| 4,480,047 | 10/1984 | Beck et al. ................................ | 502/68 |
| 4,631,261 | 12/1986 | Sato et al. ................................. | 502/68 |
| 4,636,484 | 1/1987 | Nishimura et al. ....................... | 502/68 |
| 4,877,514 | 10/1989 | Hettinger et al. ......................... | 502/68 |

*Primary Examiner*—Walter D. Griffin
*Attorney, Agent, or Firm*—Keil & Weinkauf

[57] ABSTRACT

The invention relates to a process for the preparation of catalysts or catalyst additives by kneading and/or grinding, spray-drying and heat-treating a suspension containing a catalytically active component as well as aluminum hydroxide and/or one or more aluminum hydroxy compound(s) and other binding agent(s) and optionally kaolin(ite), which comprises using one or more aluminum-containing silicic acid modification(s) of formula (I), $$H_{4+y-z}[(SiO_{4/2})_{x-y}(AlO_{4/2})_y(SiO_{3/2}O)_{4-z}(AlO_{3/2})_z],\quad (I)$$

wherein y is less than 1; z is less than 1; and x is 0, 4, 10, or 16 to 18, instead of the kaolin(ite) or a part thereof to be used as filling material. The process and the catalysts or catalyst additives render it possible to increase the butene fraction of cracked products.

5 Claims, No Drawings

PROCESS FOR THE PREPARATION OF CATALYSTS AND FOR CRACKING MINERAL OIL FRACTIONS

The invention relates to a process for the preparation of catalysts or catalyst additives useful for the cracking of mineral oil fractions by kneading and/or grinding, spray-drying and heat-treating a suspension containing a catalytically active component, preferably H-ZSM-5 zeolite, as well as aluminium hydroxide and/or one or more aluminium hydroxy compound(s) and/or one or more other binding agents and optionally kaolin(ite) and also one or more fluxing agent(s). The invention furthermore concerns the use of a silicic acid modification of formula (I), $$H_{4+y-z}[(SiO_{4/2})_{x-y}(AlO_{4/2})_y(SiO_{3/2}O)_{4-z}(AlO_{3/2})_z], \quad (I)$$

wherein y is less than 1; z is less than 1; and x is 0, 4, 10 or 16–18, prepared from aluminium-containing sodium silicate varieties by ion exchange, for cracking mineral oil fractions or for preparing olefines with branched chain.

It is known that the conversion of high-boiling mineral oil fractions to low-boiling fractions chiefly useful as fuels for petrol engines and Diesel engines—a process which became known as "fluid catalytic cracking (FCC)"—is the economically most important and (on processed volume-basis) largest process of the petroleum chemistry for several decades. The use of zeolites and, in particular, of those of the faujasite type converted to their H-form [C. J. Plank and E. J. Rosinski: Chem. Eng. Prog. Symp. Ser. 73, 26 (1967)] as active components of FCC catalysts proved to be an important technological progress.

In the last years, a number of processes have been patented, the novel character of which comprises using one or more zeolites of other types, usually H-ZSM-5, in addition to a zeolite of faujasite type employed as active component of FCC catalysts to obtain cracked products with more favourable compositions concerning the octane number and environment-deteriorating effects of the combustion products. The pertinent processes published in the patent literature can be classified to two groups:

1. The common characteristic of processes belonging to the first group is that, in addition to the faujasite-type catalyst, one or more additive(s) containing other catalytically active components is (are) added in the form of fluidizable particles of suitable composition into the reactor.

2. According to the processes of the second group, two or more catalytically active zeolitic components together are incorporated in appropriate ratios to the FCC catalyst particles, in which therefore the active components are present in the form of discrete, homogeneously distributed crystallites.

The catalysts belonging to the first group, which can be added in any optional ratio, provide the FCC process with a greater flexibility since the process can be adapted to the requirements relating to the product composition and raw materials to be processed by selecting the correct ratios.

According to the European patent specification No. 229, 609 a catalyst is prepared by using a clay mineral matrix bound with a colloidal aluminium oxide and/or silicon dioxide solution and finely dispersed ZSM-5 zeolite. The combined use of this catalyst with a usual FCC catalyst provides the conversion of high-boiling mineral oil fractions to gasoline fractions having a high octane number.

According to the U.S. Pat. No. 4,309,279 an increase in the yield of olefines from 14.4 to 21% by volume and an increase in the experimental octane number from 89.2 to 91.9 of the gasoline fraction can be achieved in the FCC process substantially at cost of the gasoline fraction if a fluidizable catalyst additive with 0.5% by mass of ZSM-5 zeolite is used as active component together with the usual FCC catalyst.

The European patent specification No. 156,490 similarly discloses a process, which essentially comprises the use of a mixture of two fluidizable catalysts as FCC catalyst. One component of the mixture is a usual FCC catalyst containing faujasite, whereas the other one is a fluidizable catalyst consisting of an amorphous aluminosilicate phase with H-ZSM-5 zeolite incorporated in an amount of 0.1 to 20% by mass. The proportion of the component containing H-ZSM-5 zeolite may be varied between 0.1 and 50% by mass. Though the composition of the product is practically not influenced by the addition of the catalyst containing 2% by mass of H-ZSM-5 zeolite, previously treated by steam at 788° C. for 25 hours, the C3/C4 fraction and within this the proportion of olefinic products as well as the octane number of gasoline fraction produced in a small amount are significantly enhanced by adding the same amount of a fresh additive previously not treated by steam.

The essence of the European patent specification No. 600,686 is similarly that a mixture consisting of an FCC catalyst containing 12.24 by mass of ultrastabilized Y-zeolite and a fluidizable catalyst additive containing 2.5 to 57.5% by mass of H-ZSM zeolite is used for the cracking of high-boiling fractions, e.g. Diesel oil vacuum distillates. An essential increase in the olefine fraction of the product, e.g. from 16% up to 36%, can be achieved by adding a catalyst additive in an amount up to 60% to usual FCC catalysts.

The U.S. Pat. No. 3,758,403 relates to an FCC catalyst obtained by incorporating a zeolite with wide pore size, preferably of faujasite type, together with a zeolite of medium pore size, preferably of the Pentasil class, in the form of discrete crystallites to a suitable matrix, and to the use thereof to produce gasolines with a high octane number.

The U.S. Pat. No. 5,077,253 reports on an FCC catalyst endowed of advantageous properties, mainly a high capacity to bind heavy metals. This catalyst contains a lower concentration in the shell of particles and a higher concentration in the core of particles of a wide-pore zeolite, preferably dealuminated Y-zeolite, a zeolite possessing cracking and isomerizing activity, preferably H-ZSM-5, and a zeolitic component, preferably Ga-ZSM-5, catalyzing aromatization.

The European patent specification No. 489,324 discloses a process useful to selectively produce olefinic and aromatic compounds and gasoline with a high octane number; this process comprises the simultaneous use of omega- and Y-zeolite as catalyst.

The utilization of faujasite and ZSM-5 type zeolites as FCC catalysts is described in the U.S. Pat. No. 3,894,934 wherein both zeolites are present in a homogeneous distribution in a matrix or they form the active component of separate catalysts. Both catalysts containing one of the active components exert their effect separately in two reaction zones separated from each other in the cracking reactor.

By means of the processes published in the patent literature in relation to the formation of FCC catalysts or additives, spherical or nearly spherical catalyst particles with appropriate size can be obtained by spray-drying of aqueous suspensions containing the catalytically active zeolitic component(s) as well as one or more suitable filling material(s). Kaolinite or other clay minerals are commonly used as filling materials in an amount of 20 to 70% related to the total mass of solids (see e.g. the U.S. Pat. Nos. 3,142,057, 3,867,308, and 4,086,187). Useful binding agents are commonly aluminium hydroxy compounds (see e.g. U.S. Pat. No. 4,458,023 and Canadian patent specification No. 967,136) and silica hydrosols (see e.g. the U.S. Pat. Nos. 3,972,835 and 3,867,308) employed in themselves or together with a selected silicon dioxide or aluminium oxide in amounts varying between wide limits, usually from 5 to 50% in relation to the total mass of solids (see e.g. the U.S. Pat. Nos. 3,957,689 and 4,493,902). The mass ratio of solids to water in the suspension to be sprayed is limited, on the one hand, by the viscosity determining the sprayability and, on the other hand, by the diameter of the catalyst particles to be prepared, which should be maintained between 20 and 100 μm. The water content of the suspension to be sprayed amounts usually to 20–60% by mass. The product obtained by spray-drying is calcined at higher temperatures, between 300° and 800° C. for several hours according to the processes published e.g. in the U.S. Pat. Nos. 4,677,084 and 4,493,902 as well as in the German patent specifications Nos. 3,001,800 and 3,317,946 in order to achieve a product with more favourable mechanical properties, particularly with a higher abrasion resistance.

The common characteristic of catalysts and processes of utilization described up to now is that, by means thereof, the yield of C3–C5 olefines is significantly increased at cost of the gasoline fraction, in addition to the increase in the octane number of the gasoline fraction obtained in the FCC process. However, the patent specifications mentioned above do not touch upon the proportions of individual butenes and pentenes in the respective fractions. At present, isobutene is above all one of the most sought products of the petroleum chemistry since, beside methanol, it is used as a starting substance for the production on an industrial scale of methyl t-butyl ether (MTBE), an additive enhancing the octane number of leadless gasoline. Thus, it is desirable to strengthen the isobutene-related selectivity of the FCC process through skeletal isomerization of other butenes.

In the course of our investigations, it has been found that aluminium-containing silicic acid modifications of formula (I), wherein y is less than 1; z is less than 1; and x is 0, 4, 10, or 16–18, chiefly the isostructural modification of silicic acid, wherein x is equal to 10, obtained from magadiite by ion exchange, under suitably selected reaction conditions catalyze the skeletal isomerization of short-chain unbranched olefines, above all of n-butenes, to branched-chain olefines containing a quaternary carbon atom.

Now it has been found that, in experiments carried out according to the standardized "Micro Activity Test (MAT)", the yield of isobutene is significantly increased at cost of other butenes, that is within the butene fraction the concentrations of the individual butenes are shifted to the limit values required by the thermodynamical equilibrium, if an FCC catalyst additive of otherwise usual composition containing a silicic acid modification of formula (I) catalyzing the skeletal isomerization of short-chain unbranched olefines is mixed in an amount of 2 to 30 % by mass to a usual FCC catalyst.

Thus, the present invention relates to a process for the preparation of catalysts or catalyst additives by kneading and/or grinding, spray-drying and heat-treating a suspension containing a catalytically active component, preferably H-ZSM-5 zeolite, as well as aluminium hydroxide and/or one or more aluminium hydroxy compound(s) and/or one or more other binding agent(s) and optionally kaolin(ite) and also one or more fluxing agent(s). According to the invention, one or more aluminium-containing silicic acid modification(s) of formula (I), wherein y is less then 1; z is less than 1; and x is 0, 4, 10, or 16 to 18, preferably 10, is/are used instead of the kaolin(ite) or a part thereof to be used as filling material.

Furthermore, the invention relates also to a catalyst or catalyst additive which contains a silicic acid modification of formula (I), wherein y is less then 1; z is less than 1; and x is 0, 4, 10, or 16 to 18, prepared from aluminium-containing sodium silicate varieties by ion-exchange.

The invention relates also to the use of this catalyst or catalyst additive for cracking of mineral oil fractions or for preparing branched-chain olefines, particularly isobutene.

We have found that the mechanical properties of catalyst particles, especially the abrasion resistance, are significantly improved if the kaolinite used as filling material or a part thereof is replaced by the silicic acid modification according to the invention. It proved to be suitable to use the silicic acid modification of the invention and kaolinite in equal amounts, in an amount of about 25% each in relation to the solid proportion of the suspension.

The main advantages of the process and catalyst or catalyst additive according to the invention are as follows:

a) Within the butene fraction of the cracked products, the amount of isobutene is increased, which is utilized for the production of methyl t-butyl ether, an additive employed for enhancing the octane number.

b) Products possessing better mechanical properties such as higher abrasion resistance are obtained.

c) The catalyst and catalyst additive according to the invention can simply be prepared by means of the usual technical equipments.

The preparation of the catalyst or catalyst additive according to the invention and the use thereof as FCC catalyst or catalyst additive are illustrated by the following non-limiting Examples.

EXAMPLE 1

Air-dry H-ZSM-5 zeolite, kaolin and a crystalline silicic acid modification with laminar structure (prepared in the case of the catalyst additive labelled by number 2 in Table 1 from magadiite isomorphically substituted by aluminium) were suspended with the mass ratios shown in Table 1 in such an amount of aluminium hydroxy chloride solution as to result in a dry substance content of 60% by mass of the suspension. The slurry was ground in a ball mill for 40 hours to accomplish that 95% by mass of the solid particles of the suspension become smaller than 10 p in size. The viscosity of the suspension measured by a rotation viscometer was found to be 2500 mPa.s at 3 s$^{-1}$ and 200 mPa.s at 1000 s$^{-1}$. The suspension was dried in a spray-dryer with 300° C. inlet temperature and 140° C. outlet temperature. The working parameters of the spraying disc were chosen in such a way that the diameters of the spherical or nearly spherical particles of the dried product were between 20 and 100 μm. Subsequently, the product was spread out on drying trays and calcined in an electric oven at 550° C. for 10 hours to obtain the suitable abrasion resistance.

The values of abrasion resistance of the fluidizable FCC catalyst additive obtained in this way are shown in Table 1.

TABLE 1

| | Additive 1 with usual composition | Additive 2 with composition according to the invention |
|---|---|---|
| H-ZSM-5 | 25% by mass | 25% by mass |
| Kaolin | 55% by mass | 30% by mass |
| Silicic acid[1] | — | 25% by mass |
| Aluminium hydroxide | 20% by mass | 20% by mass |
| Abrasion[2] | 12.5% by mass | 6.0% by mass |
| Davison Attrition Index[3] | 2.85 | 0.87 |
| Jersey Index[4] | 0.14 | 0.002 |

[1] Crystalline silicic acid with laminar structure prepared from aluminium-containing magadiite by ion-exchange.
[2] The proportion of particles with diameters smaller than 40 μm after grinding the screen fraction over 40 μm under standardized conditions for 30 minutes.
[3] Determined according to U.S. Pat. specification No. 3,957,689.
[4] Determined according to U.S. Pat. specification No. 3,957,689 from the material abraded during the second 10 minutes.

EXAMPLE 2

The FCC catalyst additive 1 with a usual composition prepared according to Example 1, and additive 2 with a composition according to the invention were mixed each in an amount of 5% by mass with a commercially available FCC catalyst containing ultrastabilized Y-zeolite exchanged with rare earth metal ions and then exposed to a steam atmosphere (1 bar) at 750° C. for 6 hours. The activity and selectivity of the catalyst mixtures concerning the catalytical cracking were investigated according to the MAT test described in detail in Oil and Gas Journal (60–63, Nov. 23) under accurate maintenance of the prescriptions relating to the experimental parameters and testing equipment. The results, which are relevant from the viewpoint of the present invention, are summarized in Table 2.

TABLE 2

| | Additive 1 with usual composition | Additive 2 with composition according to the invention |
|---|---|---|
| Conversion, % by mass | 72.2 | 72.2 |
| (C$_3$–C$_4$) oletine, yield as % by mass | 14.7 | 14.8 |
| C$_4$ olefines, % by mass | 8.1 | 8.0 |
| Coke, % by mass | 3.6 | 3.7 |
| Gasoline, yield as % by mass | 45 | 45 |
| Isobutene/total butenes | 30.5 | 33.7 |
| Motor octane number (MON) | 81.0 | 81.2 |
| Research octane number (RON) | 94.3 | 94.5 |

It can be stated that, beside an equal gross conversion and coke formation, more isobutene is obtained by using the catalyst according to the invention than with the usual catalyst.

We claim:

1. A process for the preparation of a catalyst or a catalyst additive comprising kneading, grinding, spray-drying, and heat-treating a suspension containing
   a) an H-ZSM-5 zeolite;
   b) aluminum hydroxide or one or more aluminum hydroxy compound(s);
   c) an optional kaolin(ite) component; and
   d) one or more aluminum-containing silicic acid modification(s) of the formula $$H_{4+y-z}[(SiO_{4/2})_{x-y}(AlO_{4/2})_y(SiO_{3/2}O)_{4-z}(AlO_{3/2})_z] \quad (I)$$

wherein y is less than 1; z is less than 1; and x is 0, 4, 10, or 16 to 18.

2. A process according to claim 1, wherein y is less than 1; z is less than 1; and x is 10, and wherein the aluminum-containing silicic acid modification of formula I is prepared from an aluminum-containing magadiite by ion exchange.

3. A catalyst or catalyst additive which contains a silicic acid modification of formula (I), wherein y is less than 1; z is less than 1; and x is 0, 4, 10, or 16 to 18 prepared according to the process as claimed in claim 1.

4. A process for the catalytic cracking of mineral oil fractions to produce branched-chain olefines comprising contacting the mineral oil fractions, at catalytic cracking conditions, with the catalyst prepared according to the process of claim 1.

5. A process as claimed in claim 4 wherein the branched-chain olefine is isobutene.

* * * * *

UNITED STATES PATENT AND TRADEMARK OFFICE
CERTIFICATE OF CORRECTION

PATENT NO.: 5,807,474

DATED: September 15, 1998

INVENTOR(S): BALAI et al.

It is certified that error appears in the above-identified patent and that said Letters Patent is hereby corrected as shown below:

On the cover page item [30], the foreign application priority data, "95 0334" should be --95 03334--.

On the cover page item [54], correct the first and fourth inventors names as follows:
"Märia Balai" should be --Mária Balai--; and
"Arpád Csóka" should be --Árpád Csóka--.

Signed and Sealed this

Fifteenth Day of December, 1998

Attest:

BRUCE LEHMAN

Attesting Officer

Commissioner of Patents and Trademarks